(12) United States Patent
Suciu et al.

(10) Patent No.: US 10,837,288 B2
(45) Date of Patent: Nov. 17, 2020

(54) SECONDARY FLOWPATH SYSTEM FOR A GAS TURBINE ENGINE

(71) Applicant: United Technologies Corporation, Hartford, CT (US)

(72) Inventors: Gabriel L. Suciu, Glastonbury, CT (US); Brian D. Merry, Andover, CT (US); James D. Hill, Tolland, CT (US); William K. Ackermann, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 825 days.

(21) Appl. No.: 14/853,392

(22) Filed: Sep. 14, 2015

(65) Prior Publication Data

US 2016/0076381 A1 Mar. 17, 2016

Related U.S. Application Data

(60) Provisional application No. 62/051,547, filed on Sep. 17, 2014.

(51) Int. Cl.
*F01D 5/18* (2006.01)
*F04D 29/32* (2006.01)
(Continued)

(52) U.S. Cl.
CPC .............. *F01D 5/18* (2013.01); *F01D 5/066* (2013.01); *F01D 5/084* (2013.01); *F01D 5/085* (2013.01);
(Continued)

(58) Field of Classification Search
CPC .......... F01D 5/066; F01D 5/084; F01D 5/085; F01D 5/18; F01D 11/008; F01D 25/12; F05D 2260/205; F05D 2260/211
See application file for complete search history.

(56) References Cited

U.S. PATENT DOCUMENTS

| 2,656,147 A | 10/1953 | Brownhill et al. |
| 3,709,631 A | 1/1973 | Karstensen et al. |

(Continued)

FOREIGN PATENT DOCUMENTS

| EP | 2586969 | | 5/2013 | |
| GB | 655304 A | * | 7/1951 | ............. F01D 5/084 |
| JP | 58047199 A | * | 3/1983 | ........... F04D 29/584 |

OTHER PUBLICATIONS

EP Search Report dated Mar. 17, 2016.

*Primary Examiner* — Kenneth Bomberg
*Assistant Examiner* — Jesse M Prager
(74) *Attorney, Agent, or Firm* — Getz Balich LLC

(57) ABSTRACT

A rotor assembly of a gas turbine engine may be spoked and includes a rotor and a shell. The rotor has a rotor disk and a plurality of blades each having a platform attached to the rotor disk and with a first channel defined radially between the platforms and the rotor disk. The shell projects aft of the rotor and includes inner and outer walls with a passage defined therebetween. The passage is in fluid communication with the first channel and, together, form part of a secondary flowpath for cooling of adjacent components. The rotor assembly may further include a structure located radially inward of the rotor disk and shell. The structure defines a supply conduit for flowing air from the passage and into a rotor bore defined at least in part by adjacent rotor disks. The entering air, being pre-heated when flowing through the channel and passage, warms the bore and reduces thermal gradients, thus thermal fatigue, across the rotor disk.

14 Claims, 7 Drawing Sheets

(51) Int. Cl.
    *F04D 29/58*   (2006.01)
    *F01D 5/08*    (2006.01)
    *F01D 5/06*    (2006.01)

(52) U.S. Cl.
    CPC ......... *F04D 29/321* (2013.01); *F04D 29/584* (2013.01); *F05D 2260/205* (2013.01); *F05D 2260/221* (2013.01); *Y02T 50/60* (2013.01)

(56) References Cited

U.S. PATENT DOCUMENTS

| | | | |
|---|---|---|---|
| 3,742,706 A * | 7/1973 | Klompas | F01D 5/087 |
| | | | 415/115 |
| 3,844,110 A | 10/1974 | Widlansky et al. | |
| 4,127,359 A | 11/1978 | Stephan | |
| 4,468,148 A | 8/1984 | Seymour | |
| 4,719,747 A | 1/1988 | Willkop et al. | |
| 4,795,307 A * | 1/1989 | Liebl | F01D 5/085 |
| | | | 415/115 |
| 5,340,274 A | 8/1994 | Cunha | |
| 5,741,119 A | 4/1998 | Heppenstall | |
| 6,234,746 B1 | 5/2001 | Schroder et al. | |
| 6,334,755 B1 * | 1/2002 | Coudray | F01D 5/088 |
| | | | 415/115 |
| 6,370,866 B2 | 4/2002 | Marushima et al. | |
| 6,405,538 B1 | 6/2002 | Akiyama et al. | |
| 6,514,038 B2 | 2/2003 | Akiyama et al. | |
| 6,551,056 B2 | 4/2003 | Rau | |
| 6,585,482 B1 | 7/2003 | Liotta et al. | |
| 7,520,718 B2 | 4/2009 | Engle | |
| 7,993,102 B2 | 8/2011 | Desai et al. | |
| 8,376,689 B2 | 2/2013 | Bhagavatheeswaran et al. | |
| 8,961,132 B2 | 2/2015 | Suciu et al. | |
| 2001/0000846 A1 * | 5/2001 | Marushima | F01D 25/12 |
| | | | 60/785 |
| 2010/0124495 A1 | 5/2010 | Bifulco | |
| 2010/0232944 A1 | 9/2010 | Hatman | |
| 2011/0162387 A1 | 7/2011 | Chir et al. | |
| 2011/0182745 A1 | 7/2011 | Suciu et al. | |
| 2012/0027606 A1 | 2/2012 | Malmborg | |
| 2012/0060507 A1 | 3/2012 | King et al. | |
| 2013/0108413 A1 * | 5/2013 | Suciu | F01D 11/006 |
| | | | 415/115 |

* cited by examiner

SECONDARY FLOWPATH SYSTEM FOR A GAS TURBINE ENGINE

This application claims priority to U.S. Patent Appln. No. 62/051,547 filed Sep. 17, 2014.

BACKGROUND

The present disclosure relates to a gas turbine engine and, more particularly, to a secondary flowpath system for a rotor of the gas turbine engine and method of operation.

Gas turbine rotor assemblies include successive rows of blades that extend from respective rotor disks that may be arranged in an axially stacked configuration. The rotor stack may be assembled through a multitude of systems such as fasteners, fusion, tie-shafts and various combinations thereof.

Gas turbine rotor assemblies operate in an environment where significant pressure and temperature differentials exist across component boundaries that primarily separate a core gas flow path, a secondary cooling flow path, and relatively static cavities such as rotor bores located axially between rotor disks. For high-pressure and high-temperature applications, the components experience thermo-mechanical fatigue (TMF) across these boundaries. Although resistant to the effects of TMF, the components may be of a heavier-than-optimal weight to prevent TMF and achieve the desired performance requirements.

SUMMARY

A rotor assembly of a gas turbine engine according to one, non-limiting, embodiment of the present disclosure includes a rotor for rotation about an engine axis and including a rotor disk and a plurality of blades each including a platform attached to the rotor disk with a first channel defined radially between the platforms and the rotor disk; and a shell projecting rearward from the rotor and including a radially inner wall and a radially outer wall with a passage defined between the inner and outer walls in fluid communication with the channel.

Additionally to the foregoing embodiment, the shell is disposed concentric to the engine axis and converges in a downstream direction.

In the alternative or additionally thereto, in the foregoing embodiment, the passage is annular.

In the alternative or additionally thereto, in the foregoing embodiment, the channel and the passage are part of a secondary cooling air flowpath.

In the alternative or additionally thereto, in the foregoing embodiment, the assembly includes a ring-shaped spacer disposed adjacent to and upstream of the rotor with a second channel in the spacer being in fluid communication with the first channel.

In the alternative or additionally thereto, in the foregoing embodiment, the rotor is a spoked rotor including a plurality of circumferentially spaced first spokes generally located radially between the platforms and the rotor disks, and the first channel is one of a plurality of first channels with each first channel defined circumferentially between adjacent first spokes.

In the alternative or additionally thereto, in the foregoing embodiment, the spacer includes radially inner and outer rings and a plurality of circumferentially spaced second spokes spanning radially between the inner and outer rings, and the second channel is one of a plurality of second channels with each second channel defined circumferentially between adjacent second spokes.

In the alternative or additionally thereto, in the foregoing embodiment, the shell is constructed and arranged to rotate with the adjacent rotor.

In the alternative or additionally thereto, in the foregoing embodiment, the shell is disposed concentric to the engine axis and converges is a downstream direction and the passage is annular.

In the alternative or additionally thereto, in the foregoing embodiment, the rotor disk includes a rim connected to the plurality of first spokes and defining in-part the plurality of first channels.

In the alternative or additionally thereto, in the foregoing embodiment, cooling air flows through the plurality of second channels, then through the plurality of first channels, then into the passage for cooling of the plurality of the spacers, the plurality of platforms, the rim and the hub.

In the alternative or additionally thereto, in the foregoing embodiment, the assembly includes a structure extending axially and disposed radially inward of the rotor disk and the shell, wherein the structure defines at least in-part a supply conduit in fluid communication between the passage and a rotor bore defined at least in-part between adjacent rotor disks.

A spoked rotor assembly according to another, non-limiting, embodiment includes a fore and an aft rotor each constructed and arranged to rotate about an engine axis, each rotor including at least one circumferentially extending platform and a rotor disk attached to the platform with a plurality of first channels defined radially by and between the platform and the rotor disk for flowing secondary cooling air in an axial downstream direction; a ring-shaped spacer located axially between the fore and aft rotors and defining a plurality of second channels in fluid communication with and between the plurality of first channels of each adjacent rotor; and a shell projecting axially from and aft of the aft rotor and including inner and outer walls with a passage defined between the inner and outer walls in fluid communication with the plurality of channels of the aft rotor.

Additionally to the foregoing embodiment, the passage is annular in shape.

In the alternative or additionally thereto, in the foregoing embodiment, the assembly includes a structure extending axially and disposed radially inward of the rotor disks of the fore and aft rotors and the shell, wherein the structure defines at least in-part a supply conduit in fluid communication between the passage and a rotor bore defined at least in-part between the adjacent rotor disks for heating.

In the alternative or additionally thereto, in the foregoing embodiment, the structure defines a discharge conduit in fluid communication with the rotor bore for expelling air from the rotor bore.

In the alternative or additionally thereto, in the foregoing embodiment, the spoked rotor assembly is part of a high pressure compressor and the discharge conduit is in fluid communication between the rotor bore and a low pressure turbine.

In the alternative or additionally thereto, in the foregoing embodiment, the structure is part of a high spool.

In the alternative or additionally thereto, in the foregoing embodiment, the structure is part of a high spool and a low spool with the supply conduit being in the high spool and the discharge conduit being defined at least in-part by the low spool.

A method of operating a secondary flowpath system of a gas turbine engine according to another, non-limiting, embodiment includes the steps of flowing air through a channel defined at least in-part between a platform of a blade and a rim of a rotor disk for cooling of at least the platform and the rim; flowing the air through a passage in fluid communication with the channel and defined by an annular shell projecting aft of the platform and rim for cooling of the shell; and flowing the air through a supply conduit, in fluid communication with the passage and into at least one rotor bore defined between adjacent rotor disks for heating of at least a hub of the adjacent rotor disks thereby controlling thermal gradients and reducing thermal fatigue of the rotor disk.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
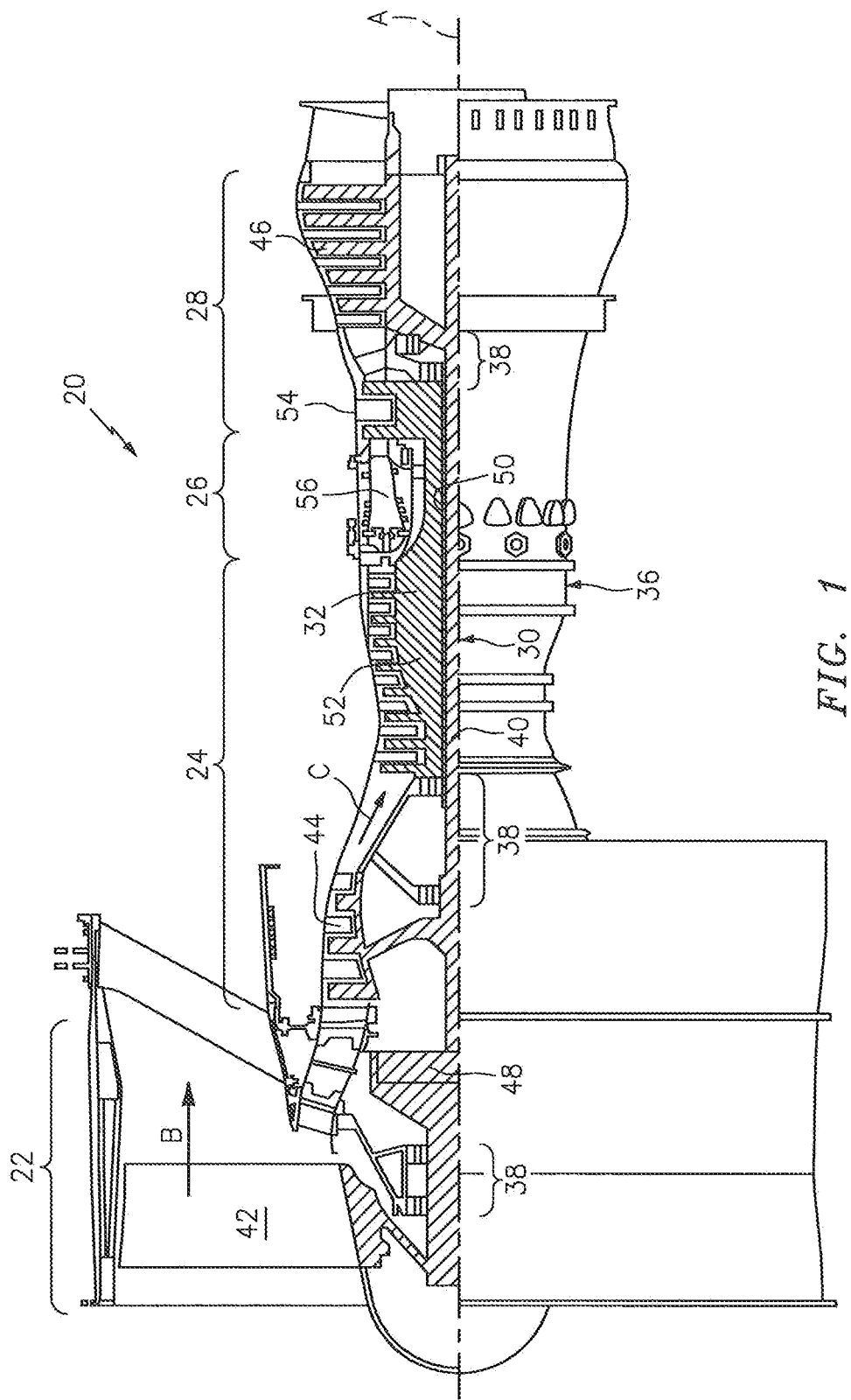
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core gas flowpath (see arrow C) for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 (LPC) of the compressor section 24 and a low pressure turbine 46 (LPT) of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 (HPC) of the compressor section 24 and a high pressure turbine 54 (HPT) of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path (see arrow B) due to the high bypass ratio. The fan section. 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
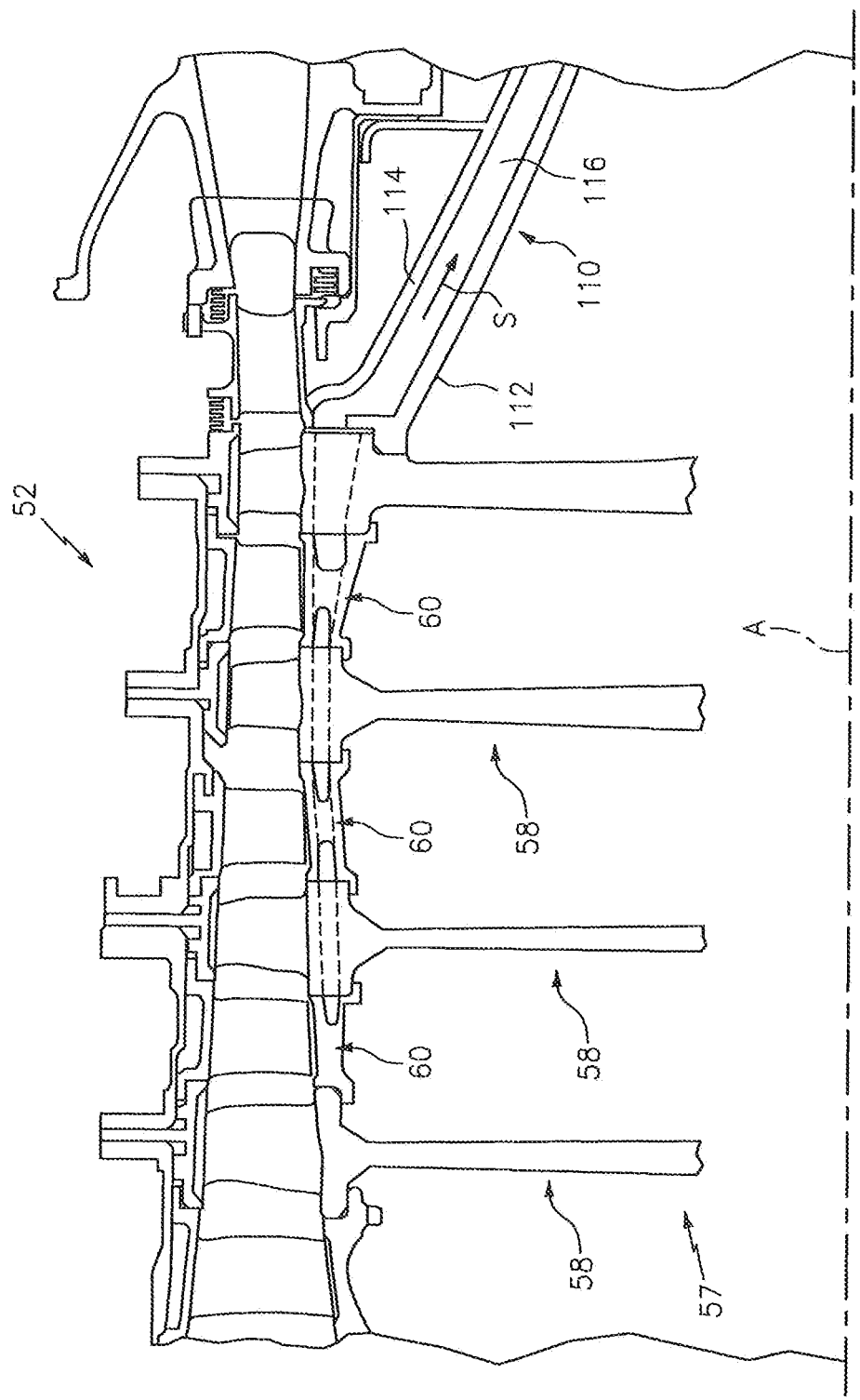
FIG. 2 is partial cross section of a high pressure compressor of the engine.

Referring to FIG. 2, the HPC 52 includes a rotor assembly 57, assembled from a plurality of successive HPC rotors 58 that alternate with HPC, ring-shaped, spacers 60 of the assembly arranged in an axially stacked configuration. The rotor stack may be assembled in a compressed tie-shaft configuration, with a central shaft (not shown) assembled concentrically within the rotor stack and secured with a nut (not shown), to generate a preload that compresses and retains the HPC rotor 58 with the HPC spacers 60 together as a spool. Friction at the interfaces between the HPC rotor 58 and the HPC spacers 60 may be solely responsible to prevent rotation between adjacent rotor hardware. That is, the rotors 58 and the spacers 60 generally rotate as one piece.

Figure 3:
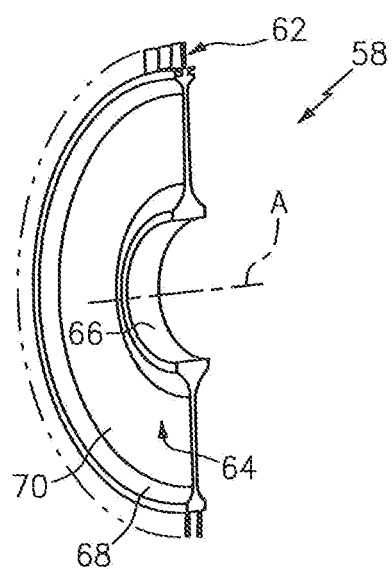
FIG. 3 is a perspective cross section of a rotor of the high pressure compressor.
Figure 4:
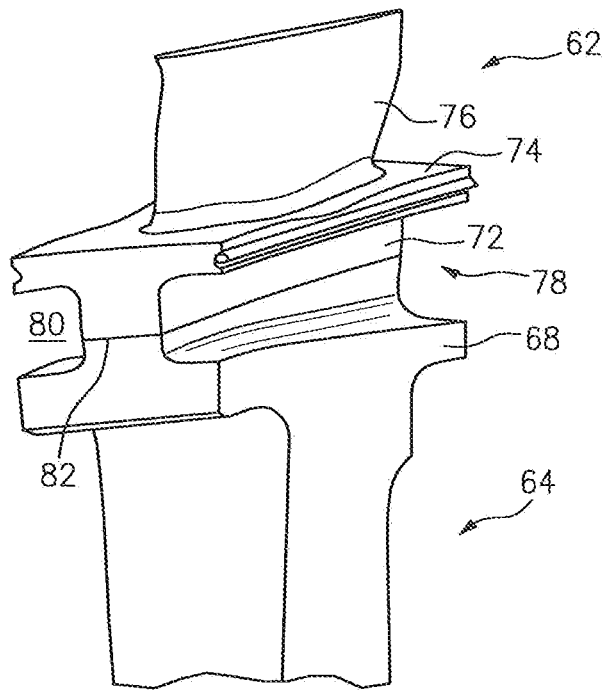
FIG. 4 is a partial perspective view of the rotor.

Referring to FIGS. 3 and 4, each HPC rotor 58 generally includes a plurality of blades 62 circumferentially spaced around a rotor disk 64. The rotor disk 64 generally includes a hub 66, a rim 68, and a web 70 that spans between the hub and rim. Each blade 62 may include an attachment section or root 72, a platform 74 and an airfoil 76. Although not shown, static vane rings or vane stages may be spaced radially outward from respective spacers 60 to redirect the core airflow upon the adjacent, aft, blades 62.

The HPC rotor 58 may be a hybrid dual alloy, integrally bladed, rotor (IBR), with the blades 62 being manufactured of one type of material and the rotor disk 64 manufactured of a different material. Bi-metal construction provides material capability to separately address varying temperature requirements. For example, the blades 62 may be manufactured of a single crystal nickel alloy that are transient liquid phase bonded with the rotor disk 64 that is manufactured of a different material such as an extruded billet nickel alloy. Alternatively, or in addition to different materials, the blades 62 may be subject to a first type of heat treatment and the rotor disks 64 to a different heat treatment thereby providing different material characteristics. That is, the bi-metal construction may include different chemical compositions as well as different treatments of the same chemical compositions such as that provided by different heat treatments.

Referring to FIG. 4, a spoke 78 may be generally carried between the rim 68 of the disk 64 and the root 72 of the blade 62. The spokes 78 may be circumferentially spaced from one another, thereby defining axial or semi-axial channels or slots 80 between adjacent spokes 78, and as part of a secondary air flowpath (see arrow S). The spokes 78 may be machined, cut with a wire EDM or other processes to provide the desired shape. An interface 82 of each spoke 78 generally defines the transient liquid phase bond and/or heat transition between the blades 62 and the rotor disk 64. That is, the spoke 78 contains the interface 82, and 'heat treat transition' is generally the transition between different heat treatments.

Different from traditional HPC designs that lack spokes, the spokes 78 of the present disclosure provides a reduced area that is not subject to thermo-mechanical fatigue (TMF) seen in more traditional outer diameter walls (i.e. blade platforms and rotor rim) due to the relatively high temperature gradient. In the present disclosure, the blade platforms 74 are exposed to the relatively hot core gas flowpath C; however, the radially inward spoked configuration acts to segment the hot outer diameter wall thus allowing for thermal growth between the platforms 74 and the rotor rim 68 of the rotor disk 64. The spoked configuration further provides the cooling channel 80 of the secondary flowpath S that thermally isolates the rotor rim 68 from the core gas flowpath C, thereby minimizing the thermal gradient between the rim 68 and the disk hub 66.

Figure 5:
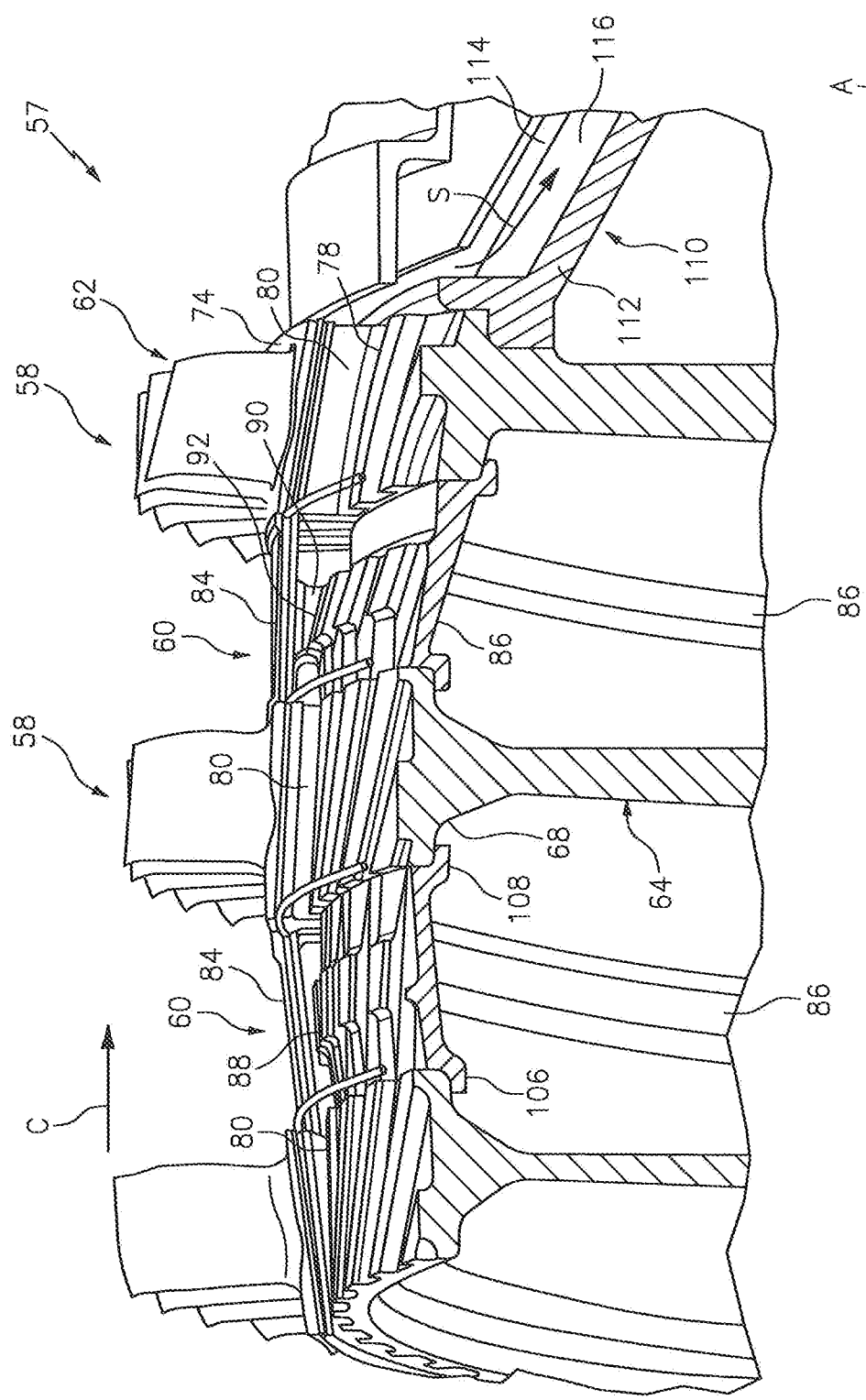
FIG. 5 is a partial perspective cross section of a rotor assembly of the high pressure compressor.
Figure 6:
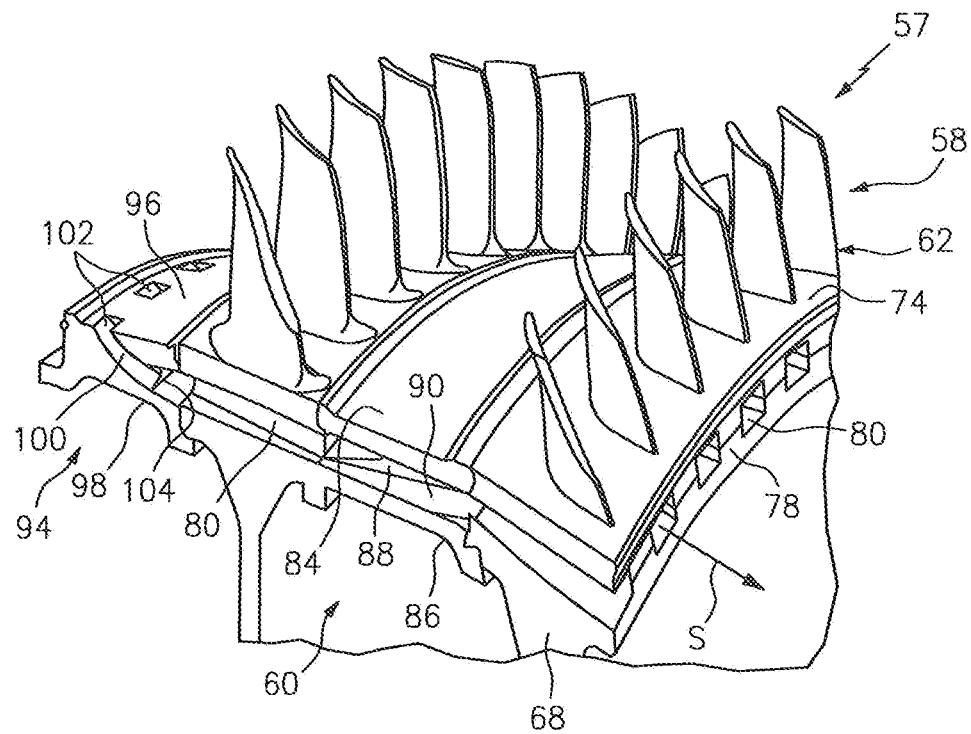
FIG. 6 is an enlarged partial perspective cross section of the rotor assembly.

Referring to FIGS. 5 and 6, the HPC spacers 60 may have a similar architecture to adjacent portions of the HPC rotors 58. That is, each spacer 60 may include an outer ring 84 that spans axially between and seals to adjacent platforms 74 of the blades 62, an inner ring 86 spaced radially inward of the outer ring 84 and spanning axially between the adjacent rims 68 of the rotor disks 64, and a plurality of spokes 88 spaced circumferentially from one-another and each spanning radially between and generally engaged to the outer and inner rings 84, 86. A plurality of channels or slots 90 may each be defined circumferentially between respective and adjacent spokes 88 and radially between the outer and inner rings 84, 86. Each spoke 88 may have an interface 92 that generally bisects each spoke and provides the bond between the outer and inner rings 84, 86.

In one, non-limiting, example, the outer rings 84 may be manufactured of the same material as the blades 62, and the inner ring 86 may be manufactured of the same material as the rotor disks 64. Alternatively, the HPC spacers 60 may be manufactured of a single material but subjected to the different heat treatments that transition within the spokes 88. In another example, a relatively low temperature configuration will benefit from usage of a single material such that the spokes 88 facilitate a weight reduction. In another example, low-temperature bi-metal designs may further benefit from dissimilar materials for weight reduction where, for example, low density materials may be utilized when load carrying capability is less of a concern.

The rotor geometry provided by the spokes 78, 88 reduces the conduction of core gas flowpath C heat to the rotor disk 64 and the sealing inner ring 86 of the HPC spacer 60. Furthermore, the spokes 78, 88, respective channels 80, 90, and cooling airflow therein; enable an IBR rotor to withstand increased exit temperatures of the high pressure compressor (T3 levels) with currently available materials. Rim cooling may also be reduced from conventional allocation. In addition, the overall configuration provides weight reduction at similar stress levels to more traditional configurations.

Referring to FIG. 6, the channels 80, 90 that flank the respective spokes 78, 88 may receive airflow from an upstream, inlet, HPC airflow supply ring 94 that may be a spacer similar to spacer 60. The supply ring 94 includes opposite outer and inner surfaces 96, 98 that may both be substantially cylindrical. A plurality of circumferentially spaced flow ducts 100 are in and defined by the supply ring 94 and may be ramped. Each duct 100 may include an inlet 102 generally defined by the outer surface 96 and an outlet 104 in direct fluid communication with respective channels 80 of the adjacent HPC rotor 58; which, in-turn, are in direct fluid communication with the channels 90 of the adjacent, downstream, spacer 60. The outer surface 96 may define in-part the core gas flowpath C, thus the inlet 102 may be in direct fluid communication with the core gas flowpath C at an upstream pressure stage location.

It is further contemplated and understood that various flow paths may be defined through various configurations of the inlet ring 94. For example, the inlet ring 94 may draw cooling flow from the core gas flowpath C flow, secondary cooling flow, or combinations thereof. The cooling airflow may be communicated not only forward to aft toward the turbine section 28, but also aft to forward within the engine 20, Further, the airflow may be drawn from adjacent static structure such as vanes to effect boundary flow turbulence as well as other flow conditions. That is, the HPC spacers 60 and the inlet ring 94 may facilitate through-flow for use in rim cooling, purge air for use down-stream in the compressor, and turbine or bearing compartment operation.

Figure 7:
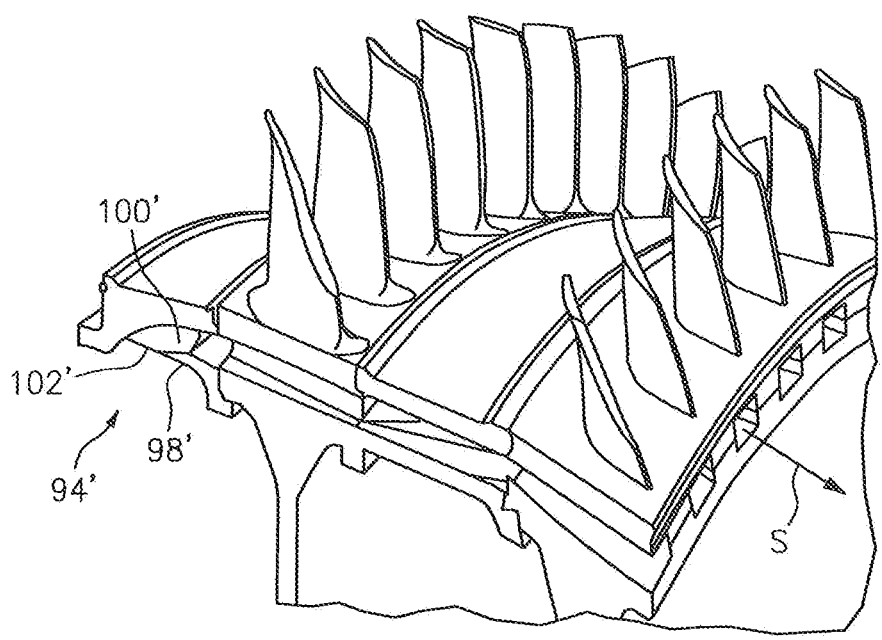
FIG. 7 is an enlarged partial perspective cross section of a second embodiment of the rotor assembly.

Referring to FIG. 7, a second, non-limiting embodiment of an inlet ring is illustrated wherein like elements have like identifying numerals except with the addition of a prime symbol as a suffix. An inlet ring 94' of the second embodiment may have flow ducts 100' having an inlet 102' that is carried and defined by an inner surface 98' of the ring 94'.

Referring to FIG. 5, each inner ring 86 of the spacers 60 may include an upstream circumferential flange 106 and a downstream circumferential flange 108 that may be located radially inboard of, and thereby captured radially, by the respective, adjacent, rotor rims 68. That is, each inner ring 86 is engaged through the stacked configuration of the HPC 52. In the disclosed tie-shaft configuration with multi-metal rotors, the stacked configuration is arranged to accommodate the relatively lower load capability alloys on the core gas flowpath C side of the rotor hardware, while maintaining the load carrying capability between the inner rings 86 and the rims 68 of the rotor disks 64 to transmit rotor torque and carry the centrifugal loads of the blades and segments 84.

The alternating rotor rim 68 to inner ring 86 configuration may carry the rotor stack preload that may be upward of 150,000 pounds (68,039 kilograms) through the high load capability material of the rotor rim 68 to inner ring 86 interface, while permitting the usage of a high temperature resistant, yet lower load capability materials in the blades 62 and the sealing outer rings 84 of the spacers 60 that are exposed to the high temperature core gas flowpath C. The axial rotor stack load path may facilitate the use of a disk specific alloy to carry the stack load and allows for the high temperature resistant material to seal the rotor from the core gas flow path. That is, the inner diameter loading and outer diameter sealing permits a segmented airfoil and seal platform design that facilitates relatively inexpensive manufacture and high temperature capability.

Figure 8:
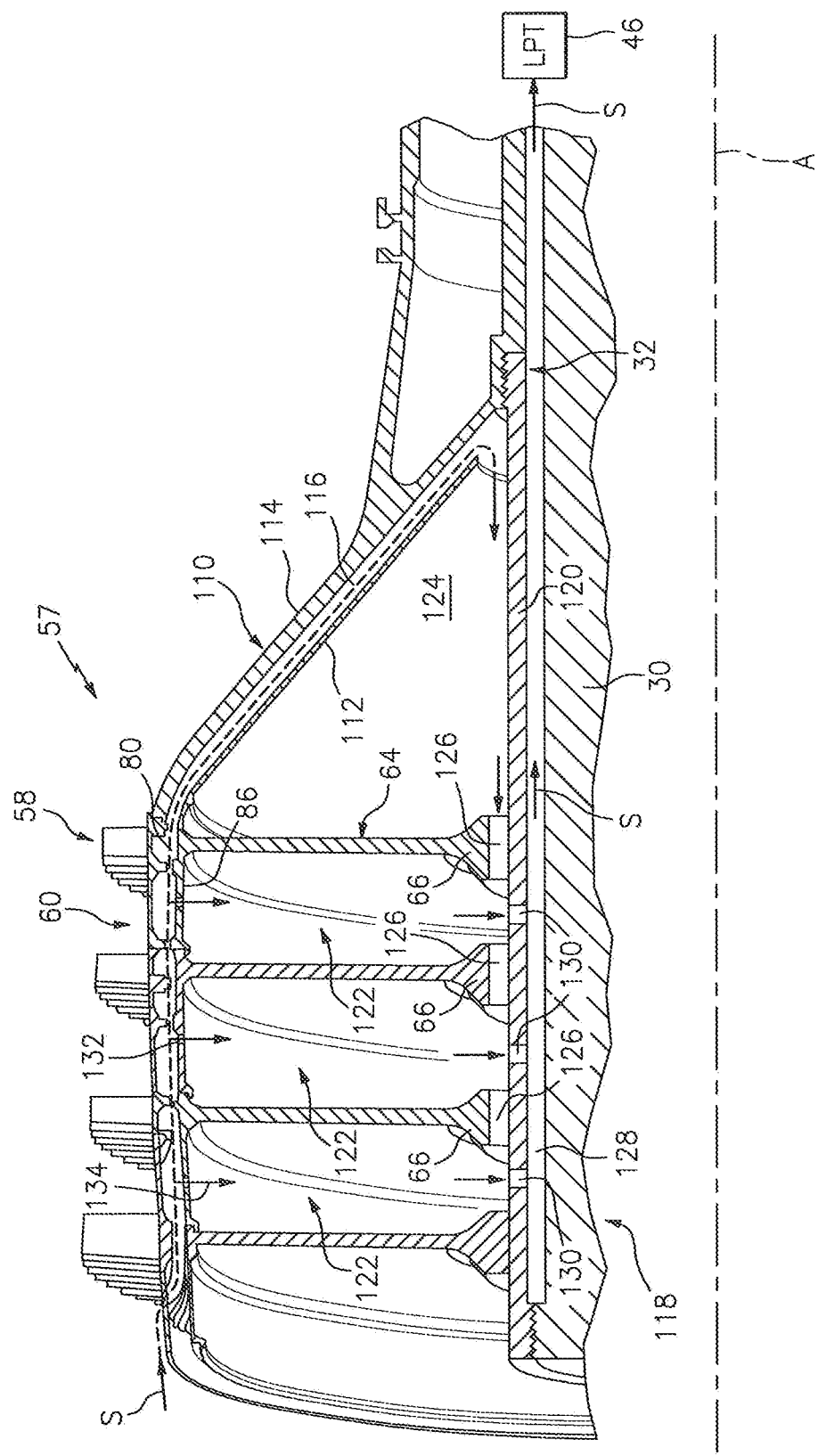
FIG. 8 is a partial cross section of the rotor assembly.

Referring to FIGS. 5 and 8, the HPC rotor assembly 57 further includes a rear shell 110 that may be attached to and project in a downstream direction from the final, downstream, rotor 58 of the rotor assembly 57. The rear shell 110 may be substantially concentric to axis A, generally conical in shape, and converges in a downstream direction. The shell 110 may include radially inner and outer walls 112, 114 with a passage 116 defined there-between. The passage 116 may generally be part of the secondary air flowpath S, may be generally annular, and may be in direct fluid communication with the channels 80 in the adjacent, upstream, rotor 58. The shell 110 may be constructed and arranged to rotate in unison with the rotors 58 and spacers 60.

Referring to FIG. 8, the rotor assembly 57 may further include a stricture 118 that may be generally located radially inward of, and axially aligned to, the hubs 66 of the rotor disks 64 and the shell 110. The structure 118, or portion thereof may generally rotate with the rotors 58, the spacers 60 and the shell 110; may extend axially; and, may be substantially concentric to axis A. With the rotor assembly 57 being part of the HPC 52, the structure 118 may generally include the low spool 30 and a tie-shaft or bore tube 120 that may be part of the high spool 32. Another example of a tie-shaft 120 is disclosed in U.S. Pat. No. 8,100,666, filed Dec. 22, 2008, assigned to Pratt & Whitney Canada Corporation of the United Technologies Corporation in Hartford, Conn., and incorporated herein by reference in its entirety.

The rotor assembly 57 further includes a plurality of forward rotor bores 122 and a rearward rotor bore 124. Each rotor bore 122 is defined axially between respective, adjacent, rotor disks 64 and radially between the inner ring 86 of the spacer 60 and the structure 110. Rotor bore 124 may be located immediately rearward of the plurality of forward rotor bores 122 and may generally be defined axially between the rearward-most rotor disk 64 and the inner wall 112 of the shell 110. Selected forward rotor bores 122 and the rearward rotor bore 124 may generally be in fluid communication with one-another through a plurality of supply conduits 126 that may be defined, in-part, by the tie-shaft 120 of the structure 110. More specifically, the supply conduits 126 may extend through the hubs 66 of a selected number of rotor disks 64 and generally adjacent to the tie-shaft 120. Each supply conduit 126 at each respective rotor disk 64 may further be a plurality of circumferentially spaced conduits with the number of conduits and size generally dictated by the thermal gradient of the respective rotor disk.

The rotor assembly 57 may further include an axially extending discharge conduit 128 that may be defined, at least in-part, radially between the tie-shaft 120 and the low spool 30. The discharge conduit 128 may include at least one inlet 130 extending radially through the tie-shaft 120, and being in fluid communication between the discharge conduit 128 and at least the forward-most rotor bore 122 that is predetermined to require a warm airflow due to an excessive temperature gradient. It is further contemplated and understood that each rotor bore 122 may communicate with a respective inlet 130. The distribution of inlets 130 and individual flow cross section areas of the inlets may generally be dependent upon the temperature gradients of the adjacent disks 64 of each respective rotor bore 122.

In operation, the secondary airflow first flows through the channels 80, 90 thus cooling and picking up heat from the adjacent rims 68 of the disks 64, roots 72 of the blades 62, and outer and inner rings 84, 86 of the spacers 60. From the rearward-most channels 80, the secondary airflow enters the passage 116 in the shell 110 and may pick up further heat from the surrounding walls 112, 114. In a warmed or heated state, the secondary airflow may then enter the rearward-most rotor bore 124, flow in an axial forward direction, through the conduit 126, and into the upstream rotor bore 122. This flow may continue in the forward direction and into successive rotor bores 122 through successive conduits 126 as dictated by the thermal needs of the rotor assembly 57. As the heated secondary airflow enters the conduits 126 and bores 122, the air heats the rotor hubs 66 and may heat a portion of the webs 70 of the rotor disks 64, thereby reducing temperature gradients that reduces thermal stress. A reduction in thermal stress increases rim life, facilitates a reduction in bore size and rotor weight, and may realize achievement of a full life HPC rotor.

From at least the forward-most rotor bore 122, the secondary airflow is discharged horn the rotor bore, through the inlet 130, and into the discharge conduit 128. The discharge conduit 128 may generally channel the airflow (as one, non-limiting, example) to the HPT 46. This expelled airflow may generally be dumped into a pre-specified stage of the LPT 46 to achieve the desired pressure differentials through the entire secondary air flowpath S, wherein the channels 80, 90, the passage 116, the supply conduits 126 and the discharge conduit 128 may be considered part or all of the secondary flowpath S.

Each inner ring 86 may further have at least one aperture 132 for flowing a portion of secondary airflow from at least one of the channels 90 of the spacers 60 and into the respective bores 122 for ventilation. This ventilating airflow (see arrow 134 in FIG. 8) may be minimal and may amount to one to two percent of the airflow flowing through the passage 116. The ventilating airflow 132 may be discharged from the bores 122 via the discharge conduit 128.

TMF may occur in traditional rotors because of large temperature differences between the full hoop ring (flowpath side) and the inner full hoop ring (i.e. hubs 66). These rings may tend to grow or thermally expand in different amounts due to the different temperatures that each are exposed to;

thus, generally causing a fight or interference between the rings. The spoked rotor configuration of the present disclosure may substantially eliminate the TMF on the hot flowpath side and the spokes 78 because the hot ring is divided into segments thereby eliminating any interference. In more traditional engine designs, another location for TMF would be the inner rings 68, 86; however, through application the present disclosure, the rings 68, 86 are now cooler than the hot ring due to the cooling of the present disclosure making the temperature delta between the rings and hubs 66 much less. This essentially eliminates or greatly reduces the TMF.

Figure 9:
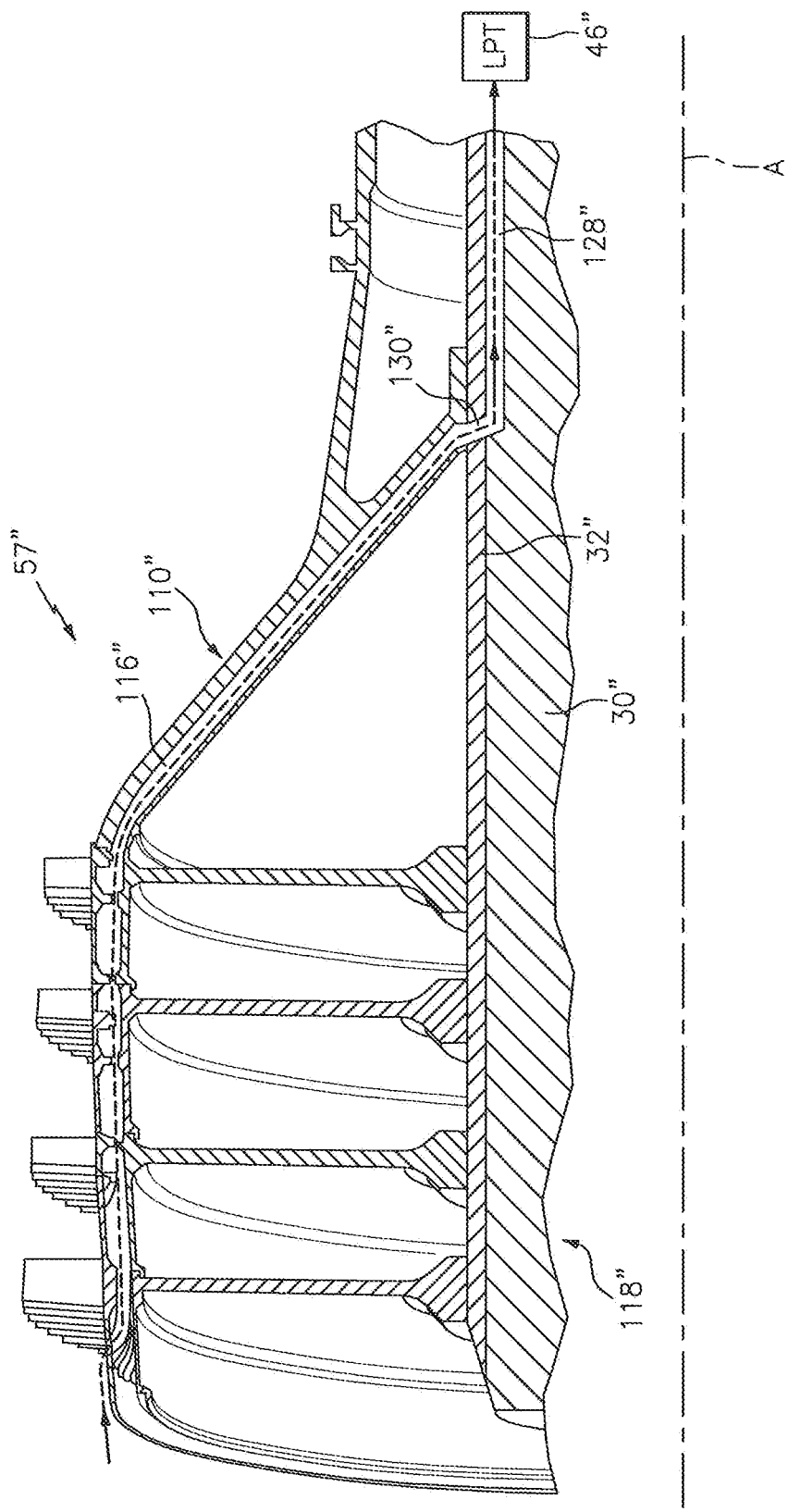
FIG. 9 is a partial cross section of a third embodiment of the rotor assembly.

Referring to FIG. 9, a third embodiment of a rotor assembly is illustrated wherein like elements to the first embodiment have the same identifying numerals except with the addition of a "double prime" suffix. The rotor assembly 57" of the third embodiment may not heat the rotor hubs 66" and instead, the secondary airflow may cool the shell 110" and may then flow directly to an LPT 46". That is, secondary airflow is routed through a passage 116" in the shell 110", then directly into an inlet 130" and into a discharge conduit 128". The inlet 130" may be in and communicate through a high spool 32" and the discharge conduit 128" may be defined radially between the low and high spools 30", 32". Although not illustrated, it is further contemplated and understood that the secondary airflow, once serving the HPC, may be routed to the HPT or elsewhere within the engine.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A rotor assembly for a compressor of a gas turbine engine with an engine axis, the rotor assembly comprising:
   a shaft;
   a rotor attached to the shaft for rotation about the engine axis, the rotor including a rotor disk and a plurality of blades, each of the plurality of blades including a platform attached to a rim of the rotor disk with a first channel defined radially between the platforms and the rim, and each of the plurality of blades configured as a compressor blade, wherein the rotor is a final downstream rotor in the compressor;
   a shell attached to and projecting rearward from the rotor and including a radially inner wall and a radially outer wall with a passage defined between the inner and outer walls in fluid communication with the first channel, wherein the shell is constructed and arranged to rotate with the rotor;
   wherein the radially inner wall is attached to the rim; and
   wherein an outer surface of the radially outer wall converges radially inward as the shell extends in an axial downstream direction away from the rim such that the outer surface is acutely angled relative to the engine axis; and
   a ring-shaped spacer disposed adjacent and upstream of the rotor, the ring-shaped spacer including a second channel and an aperture, the second channel extending axially through the ring-shaped spacer and in fluid communication with the first channel, and the aperture extending radially through an inner ring of the ring-shaped spacer and in fluid communication with a rotor bore;
   wherein the rotor is a spoked rotor including a plurality of circumferentially spaced first spokes located radially between the platforms and the rotor disks, and the first channel is one of a plurality of first channels with each first channel defined circumferentially between adjacent first spokes; and
   wherein the spacer includes radially inner and outer rings and a plurality of circumferentially spaced second spokes spanning radially between the inner and outer rings, and the second channel is one of a plurality of second channels with each second channel defined circumferentially between adjacent second spokes.

2. The rotor assembly set forth in claim 1, wherein the shell is disposed concentric to the engine axis.

3. The rotor assembly set forth in claim 1, wherein the passage is annular.

4. The rotor assembly set forth in claim 1, wherein the first channel and the passage are part of a secondary cooling air flowpath.

5. The rotor assembly set forth in claim 1, wherein the shell is disposed concentric to the engine axis and the passage is annular.

6. The rotor assembly set forth in claim 1, wherein the rim is connected to the plurality of first spokes and defining in-part the plurality of first channels.

7. The rotor assembly set forth in claim 6, wherein cooling air flows through the plurality of second channels, then through the plurality of first channels, then into the passage for cooling of the plurality of the spacers, the plurality of platforms, the rim and a hub.

8. The rotor assembly set forth in claim 1 further comprising:
   a structure extending axially and disposed radially inward of the rotor disk and the shell, wherein the structure defines at least in-part a supply conduit in fluid communication between the passage and the rotor bore defined at least in-part between adjacent rotor disks.

9. A spoked rotor assembly comprising:
   a shaft;
   a fore and an aft rotor each constructed and arranged to rotate about an engine axis with the shaft, each rotor including at least one circumferentially extending platform and a rotor disk attached to the platform with a plurality of first channels defined radially by and between the platform and a rim of the rotor disk for flowing secondary cooling air in an axial downstream direction;
   a ring-shaped spacer located axially between the fore and aft rotors, the ring-shaped spacer defining a plurality of second channels in fluid communication with and between the plurality of first channels of each adjacent rotor, wherein an aperture extends radially through an inner ring of the ring-shaped spacer and fluidly couples a first of the plurality of second channels with a rotor bore;

a shell attached to and projecting axially from and aft of the aft rotor and including inner and outer walls with a passage defined between the inner and outer walls in fluid communication with the plurality of channels of the aft rotor, wherein the shell is constructed and arranged to rotate with the fore rotor and the aft rotor;

wherein the radially inner wall contacts the rim of the aft rotor; and wherein the shell converges radially inward to the shaft as the shell extends in the axial downstream direction away from the rim of the aft rotor; and a structure extending axially along the engine axis and disposed radially inward of the rotor disks of the fore and aft rotors and the shell, the structure forming at least in-part a supply conduit in fluid communication between the passage and the rotor bore which is formed axially between the rotor disk of the fore rotor and the rotor disk of the aft rotor, and the structure forming a discharge conduit in fluid communication with the rotor bore for expelling air from the rotor bore.

10. The spoked rotor assembly set forth in claim 9, wherein the passage is annular in shape.

11. The spoked rotor assembly set forth in claim 9, wherein the spoked rotor assembly is part of a high pressure compressor and the discharge conduit is in fluid communication between the rotor bore and a low pressure turbine.

12. A method of operating a secondary flowpath system of a gas turbine engine, comprising:

flowing air through a channel defined at least in-part between a platform of a blade and a rim of a rotor disk for cooling of at least the platform and the rim, wherein the rotor disk is a final downstream rotor disk in a compressor of the gas turbine engine;

flowing the air through a passage in fluid communication with the channel and defined by an annular shell attached to and projecting aft of the platform and the rim for cooling of the shell, the annular shell comprising a radially inner wall and a radially outer wall, wherein the passage extends between the radially inner wall and the radially outer wall, and wherein the radially inner wall axially engages and is connected to the rim; and flowing the air through a supply conduit in fluid communication with the passage and into at least one rotor bore defined between adjacent rotor disks for heating of at least a hub of the adjacent rotor disks thereby controlling thermal gradients and reducing thermal fatigue of the rotor disk, wherein the adjacent rotor disks include the rotor disk;

wherein the air flows sequentially from the channel, through the passage and to the supply conduit.

13. The spoked rotor assembly of claim 9, wherein the structure is part of a high spool and a low spool, the supply conduit is formed in the high spool, and the discharge conduit is formed by and extends radially between the low spool and the high spool.

14. The rotor assembly of claim 1, wherein the rotor disk is a final downstream rotor disk in the compressor.

* * * * *